US007756046B2

(12) United States Patent
Habu et al.

(10) Patent No.: US 7,756,046 B2
(45) Date of Patent: Jul. 13, 2010

(54) APPARATUS AND METHOD FOR LOCATING TROUBLE OCCURRENCE POSITION IN COMMUNICATION NETWORK

(75) Inventors: Takuya Habu, Kawasaki (JP); Yuki Unno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

(21) Appl. No.: 11/796,540

(22) Filed: Apr. 27, 2007

(65) Prior Publication Data

US 2007/0258476 A1 Nov. 8, 2007

Related U.S. Application Data

(63) Continuation of application No. PCT/JP2004/016161, filed on Oct. 29, 2004.

(51) Int. Cl.
*H04L 12/26* (2006.01)
(52) U.S. Cl. .................................. 370/245; 370/248
(58) Field of Classification Search ........................ None
See application file for complete search history.

(56) References Cited

U.S. PATENT DOCUMENTS

| | | | | |
|---|---|---|---|---|
| 6,757,242 | B1 * | 6/2004 | Wang et al. .................. | 370/216 |
| 7,188,280 | B2 * | 3/2007 | Shinomiya et al. ............ | 714/43 |
| 7,535,825 | B1 * | 5/2009 | Callon ........................ | 370/216 |
| 2002/0138645 | A1 * | 9/2002 | Shinomiya et al. .......... | 709/238 |
| 2003/0021281 | A1 * | 1/2003 | Tanaka et al. ............... | 370/401 |
| 2006/0002409 | A1 * | 1/2006 | Menon et al. ............... | 370/409 |
| 2006/0095815 | A1 * | 5/2006 | Noy et al. ................... | 714/712 |
| 2006/0126503 | A1 * | 6/2006 | Huck et al. ................. | 370/225 |

FOREIGN PATENT DOCUMENTS

| | | |
|---|---|---|
| JP | 01-099345 | 4/1989 |
| JP | 09-186716 | 7/1997 |
| JP | A 11-331236 | 11/1999 |
| JP | 2003-179601 | 6/2003 |
| JP | 2003-333104 | 11/2003 |

OTHER PUBLICATIONS

Hideo Imanaka, et al., "A network reconstruction method against link failure on subscriber loops," Institute of Electronics, Information and Communication Engineers (IEICE) Technical Report, pp. 1-9, Jan. 26, 1990.

* cited by examiner

*Primary Examiner*—Min Jung
(74) *Attorney, Agent, or Firm*—Greer, Burns & Crain, Ltd.

(57) ABSTRACT

When a communication abnormality has occurred, links that are included in the communication path on which the communication abnormality has occurred and that are included in communication paths between nodes that allow communication are excluded while referring to information on physical links between nodes in the communication network and path information specifying at least one link included in communication paths between two points, and thereby the scope of positions that are plausible candidates for having been involved in a failure is narrowed.

9 Claims, 19 Drawing Sheets

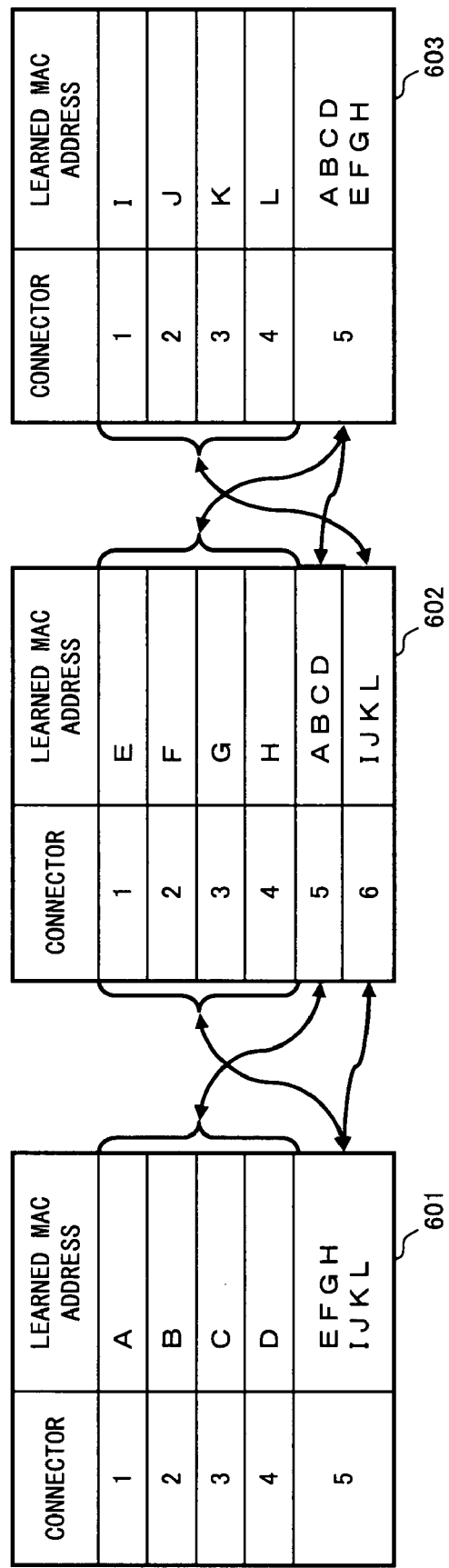
F I G. 6

| LAYER | CONNECTION ID | NODE | CONNECTOR |
|---|---|---|---|
| PHYSICAL | 1 | WEB-a | eth0 |
| | | SW-a | port1 |
| | 2 | WEB-a | eth1 |
| | | SW-b | port1 |
| | 3 | WEB-b | eth0 |
| | | SW-a | port2 |
| | 4 | WEB-b | eth1 |
| | | SW-b | port2 |
| | 29 | SW-e | port6 |
| | | AP-b | eth0 |
| | 30 | SW-f | port6 |
| | | AP-b | eth1 |

FIG. 13

| CONNECTION ID | SOURCE POINT OF LINK | | SINK POINT OF LINK | | WEB-b → AP-b | WEB-b → AP-a | WEB-a → AP-b | RESULT |
|---|---|---|---|---|---|---|---|---|
| | NODE | CONNECTOR | NODE | CONNECTOR | | | | |
| 4 | WEB-b | eth1 | SW-b | port2 | | | | |
| 10 | SW-b | port6 | FW-b | Port2 | ● | ● | | |
| 14 | FW-b | port4 | SW-d | Port2 | ● | ● | | |
| 20 | SW-d | port6 | SLB-b | Port2 | ● | ● | | |
| 24 | SLB-b | port4 | SW-f | port2 | ● | | | ★ |
| 30 | SW-f | port6 | AP-b | eth1 | | | ● | |
| WHETHER COMMUNICATION IS POSSIBLE OR IMPOSSIBLE | | | | | × | ○ | ○ | |

F I G. 16

APPARATUS AND METHOD FOR LOCATING TROUBLE OCCURRENCE POSITION IN COMMUNICATION NETWORK

CROSS REFERENCE TO RELATED APPLICATION

This application is a continuation application of International PCT Application No. PCT/JP2004/016161 which was filed on Oct. 29, 2004.

BACKGROUND OF THE INVENTION

1. Field of the Invention

The present invention relates to the operation management of network systems used in intranets in environments of Internet data centers (IDCs) or the like, and relates to an apparatus and a method for automatically squeezing positions that are plausible candidates for having been involved in a failure that caused a communication abnormality; the failure occurs in the network in which the communication abnormality occurs.

2. Description of the Related Art

In the field of failure detection in the operation management of networks, the status of a network is monitored by employing a configuration in which a test communication is periodically performed between two points in the network, and it is confirmed that the test communication is normally completed.

FIG. 1 shows an example of the above network system. In FIG. 1, a network 101 that is to be monitored comprises a wide area IP (Internet Protocol) communication network 116 and the following devices.
Spoke routers 111 through 115
Routers 117 and 118
Switches (SW) 119, 120, 123, 124, 127, 128, 133, 134, 137, 138, 141, 142, 147, and 148
Firewalls 121, 122, 135, and 136
Server load balancers 125, 126, 139, and 140
Web servers 129 through 132
Application servers 143 through 146
Database servers 149 and 150

In this configuration, the wide area IP communication network 116 functions as an IP-VAN (Internet Protocol-Virtual Private Network). There are two methods for realizing the test communication and realizing the acquisition of data of the result of the test communication, as below.

(a) An operation management server 102 is provided at a particular point in the network as shown in FIG. 1, and test communication with respect to the respective nodes (devices) in the network that is to be monitored is periodically performed from the operation management server 102 via switches 151 through 155. Then, both whether or not the communication can be successfully performed and the status of the communication are checked by utilizing a communication that is based on ping (Packet Internet Groper), SNMP (Simple Network Management Protocol), or the like. The communication paths are not taken into consideration. The data of the check results is accumulated in the operation management server 102, and the results are reported to a network manager 103 by way of, for example, displaying the devices involving failures on a diagram showing the network.

(b) Agent programs for monitoring communication are installed in a plurality of nodes 118, 132, 145, and 149 in the network 101 as shown in FIG. 2 (node 118 often includes the preloaded agent program because it is a router). Then, test communication is performed between the agents, and both whether or not the communication can be successfully performed and the status of the communication are checked, and the result is transferred to the operation management server 102. Thereafter, the results are reported to a network manager 103 by way of, for example, displaying the devices involving failures on a diagram showing the network. In this configuration, the information on the communication path between the nodes in which the agent programs are installed is not utilized.

In both methods (A) and (B), when it is determined by the operation management server 102 that the test communication involves an abnormality, it is reported to the network manager 103 that the network communication status is abnormal with respect to the corresponding nodes by way of, for example, displaying the event on a screen.

However, in both methods, the fact that is grasped is whether or not communication is normal at a particular time and between "two particular points", and this fact is not grasped by the operation management server 102 for which communication paths lie between the two particular points. The methods of detecting failures in networks based on the above configurations involve the following problems.

(1) When communication between two points involves an abnormality, it cannot be ascertained where (in which part) between the two points the failure occurred that has caused the abnormality.

To begin with, failure detection in networks mainly aims at shortening the time period during which communication is in an abnormal state by quickly recovering the network when the failure occurs, and if the network is to be recovered quickly it is important to find, in a short time, the cause of the communication abnormality, i.e., to locate the position at which the failure has occurred.

Generally in network communication, even if there is only one position on a communication path that is blocking communication, the communication cannot be performed normally. This means that when communication between two devices involves an abnormality and there are many network devices between those two devices, the two nodes themselves and all the network devices between the two nodes are plausible candidates for having been involved in the failure that caused the abnormality, which constitutes a very large pool of candidates. When a network manager has to find and cure the failure that caused the communication abnormality, all of these nodes and devices have to be examined.

The network manager has to examine all of the operation management servers 102, the routers 117, and the switches 151 through 154 when, for example, a communication abnormality occurs between the operation management server 102 and the router 117 in the configuration shown in FIG. 3.

It is possible to squeeze the positions that are plausible candidates for being involved in a failure on the basis of an analysis and judgment of the network manager by combining information of the communication abnormality with information that indicates normal communication between other pairs of points. However, accuracy of judgment decreases when the judgment is made by a human being, and it takes a longer time to squeeze the positions that are plausible candidates for having been involved in a failure, which results in a longer wait for the network to recover from the abnormal state.

(2) When communication between two points involves an abnormality and it is assumed that there is a plurality of physical communication paths between the two points, it cannot be ascertained which communication path contains the communication involving the abnormality.

Even in case (1), when there is only one physical communication path between the two points that the abnormality is between, it is difficult to squeeze the positions that are plausible candidates for having been involved in a failure. Further, intranets and the Internet are often configured to have a plurality of physical communication paths between two nodes. In such cases, the positions that are plausible candidates for having been involved in a failure that caused the communication abnormality between two points includes all of the devices disposed on the physical communication paths that could be used for the communication. This means that a long time is required to solve the problem of the communication abnormality, as described in case (1).

For example, when a communication abnormality occurs between the web server 132 and the application server 146 in FIG. 3, all the devices included in areas 301 through 303 are plausible candidates for having been involved in a failure.

If an investigation to try to grasp which communication path was used for the abnormal communication between the two points can be conducted after the detection of the abnormal communication in the above case, it will be possible to squeeze the positions that are plausible candidates for having been involved in a failure. However, this type of investigation is generally thought to be difficult. This is because it is impossible to perform actual communication between the two points for the confirmation because the communication between the two points has already been involved in the abnormality.

(3) When an abnormality is detected in a communication between two points, it is impossible to grasp the incidences over which the abnormality has influence and the urgency with respect to services.

For example, a communication abnormality between two points could be detected in an intranet and there could be two networks between the two points, i.e., a network that is used for customer services and has a high importance, and a network that is used as a spare network when an abnormality occurs and has a low importance.

If the position at which the failure has occurred is included in a device used for the network with a high importance, the situation has to be dealt with urgently because this failure has influence on customer services. In contrast, the incidence of the abnormality is not extensive if the failure has occurred in a device used for the network with a low importance, and therefore the situation can often be dealt with posteriorly.

The network manager cannot determine whether or not the failure has occurred in the network with a high importance on the basis of only information reporting that there is a communication abnormality between the two points. In actual cases, it often happens that even when an incidence of failure is not extensive and the situation does not have to be dealt with urgently, the situation is dealt with urgently because the possibility of a serious failure is taken into consideration, and an unnecessarily high labor cost often results.

Additionally, a network system that locates the position in which a failure has occurred on the basis of alarm information issued by a constituent element in the network when the failure has occurred in the network (Patent Document 1 for example)

Patent Document 1
Japanese Patent Application Publication No. 2003-179601

SUMMARY OF THE INVENTION

It is an object of the present invention to solve in a short time a communication abnormality by automatically squeezing positions that are plausible candidates for having been involved in a failure causing the communication abnormality when the communication abnormality occurs in a communication network.

The apparatus for locating a position at which a failure has occurred according to the present invention comprises a storing unit and a determination unit. The storing unit stores link information specifying physical links connecting nodes in a communication network having a plurality of nodes, and path information specifying at least one link that is included in communication paths from a source node to a sink node in the communication network. The determination unit excludes links that are included in a communication path on which a communication abnormality has occurred and that are included in a communication path between nodes that allow communication, and determines that links that are not excluded or nodes at both ends of the links that are not excluded are candidates for the position at which a failure has occurred, while referring to the link information and the path information when a communication abnormality has occurred in the communication network.

According to the above apparatus for locating a position at which a failure has occurred, it is possible to automatically squeeze positions that are plausible candidates for having been involved in the failure into a pool of candidates that only includes particular links or nodes.

The storing unit can correspond to, for example, a memory unit 1802 or an external storage device 1805, both of which are shown in FIG. 18 and will be described later. The determination unit can correspond to, for example, a failure-occurring-position determination unit shown in FIG. 10 that will be described later.

BRIEF DESCRIPTION OF THE DRAWINGS

FIG. 6 shows MAC learning tables;

FIG. 13 shows link information;

FIG. 16 shows determination process data;

DESCRIPTION OF THE PREFERRED EMBODIMENTS

Figure 1:
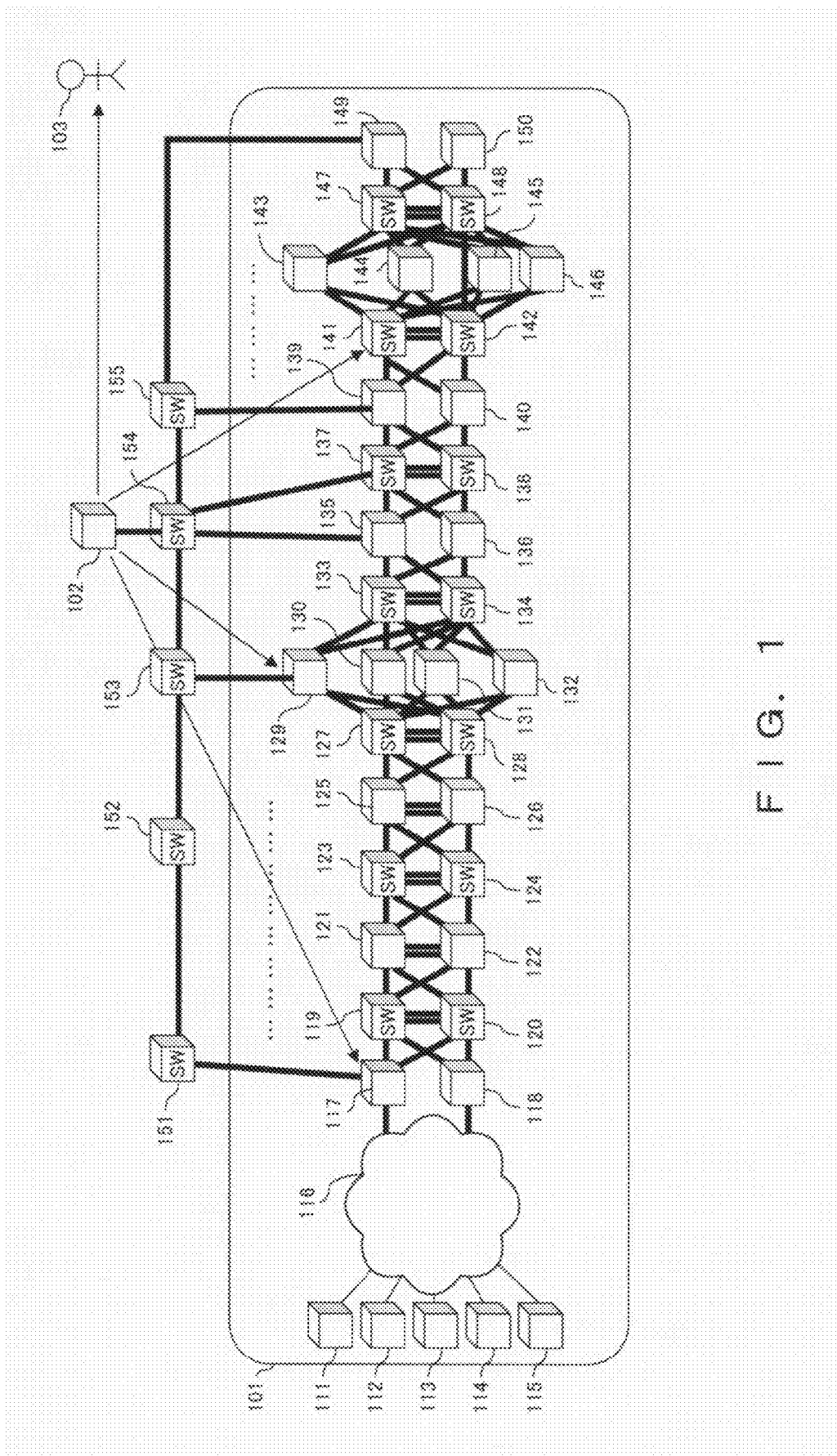
FIG. 1 shows a test communication performed by an operation management server in a conventional network system.
Figure 2:
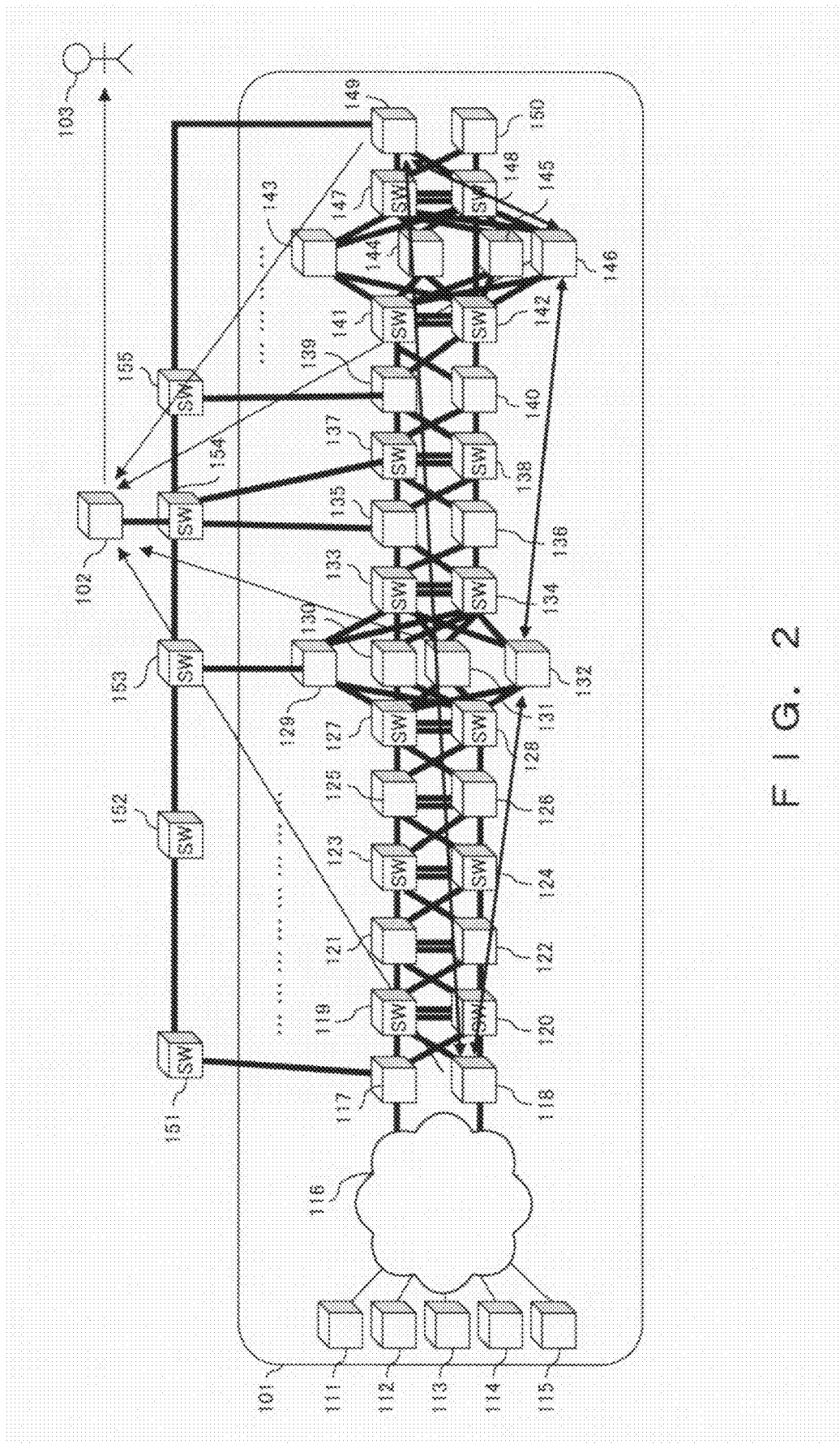
FIG. 2 shows a test communication performed by an agent in a conventional network system.
Figure 3:
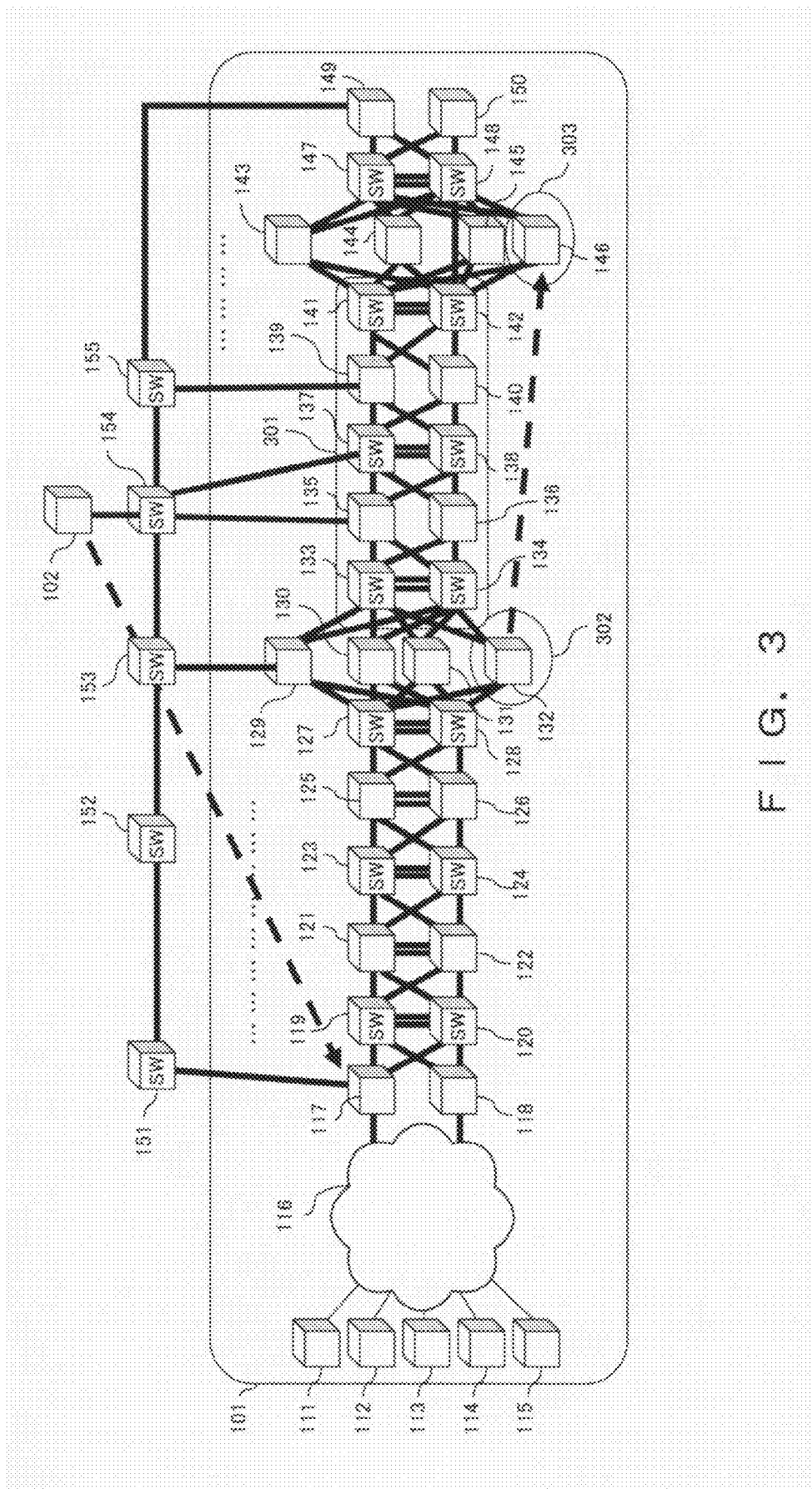
FIG. 3 shows an occurrence of a communication abnormality in a conventional network system.

Hereinafter, best modes for implementing the present invention will be explained in detail by referring to the drawings.

In the present embodiment, the positions that are plausible candidates for having been involved in a failure are squeezed on the basis of the topologies and path information of the communication networks. The topology is logical and a physical connection configuration exists among the devices that constitute a network.

In this case, the latest "link information" and "path information" of the network that is to be monitored has to be prepared prior to the occurrence of a failure. The "link information" specifies physical connection relationships among the respective devices in the network. The "path information" specifies communication paths, including those at a physical level, between two points in the network.

The "link information" and the "path information" can be obtained periodically and automatically by using the "topology search technique" and "path search technique" disclosed in, for example, Japanese Patent Application Publication No. 2004-164778, which was priorly filed. Accordingly, the outline of the "topology search technique" and "path search technique" will be explained by referring to FIGS. 4 through 8.

(1) Topology Search Technique

In this technique, information on all the layers ranging from the physical layer to the application layer is automatically collected from the respective network devices and analyzed, by using the SNMP-MIB (Simple Network Management Protocol-Management Information Base) or the like, on the basis of a model expressing the topology that integrates all the above layers; thereby the system grasps the network topology across the respective layers, and this topology is drawn and displayed as a map. By using this technique, it is possible to easily grasp the topology across all the layers, which has been conventionally difficult.

The significance of this technique lies particularly in the fact that when this technique is applied to the technique of squeezing positions that are plausible candidates for having been involved in a failure, the "link information" can be obtained by performing the topology search on the physical layer; in other words, the connection relationship can be grasped at the level of connections between ports in the respective devices.

The estimation based on experiments supports an assumption that the result of the topology search on a network consisting of approximately one thousand devices can be output within approximately sixty minutes when using a program to which this technique is applied. It is possible for a network manager to grasp the latest network topology across the layers, including the physical layer, on a day-by-day basis by utilizing this technique periodically, e.g., everyday.

Figure 4:
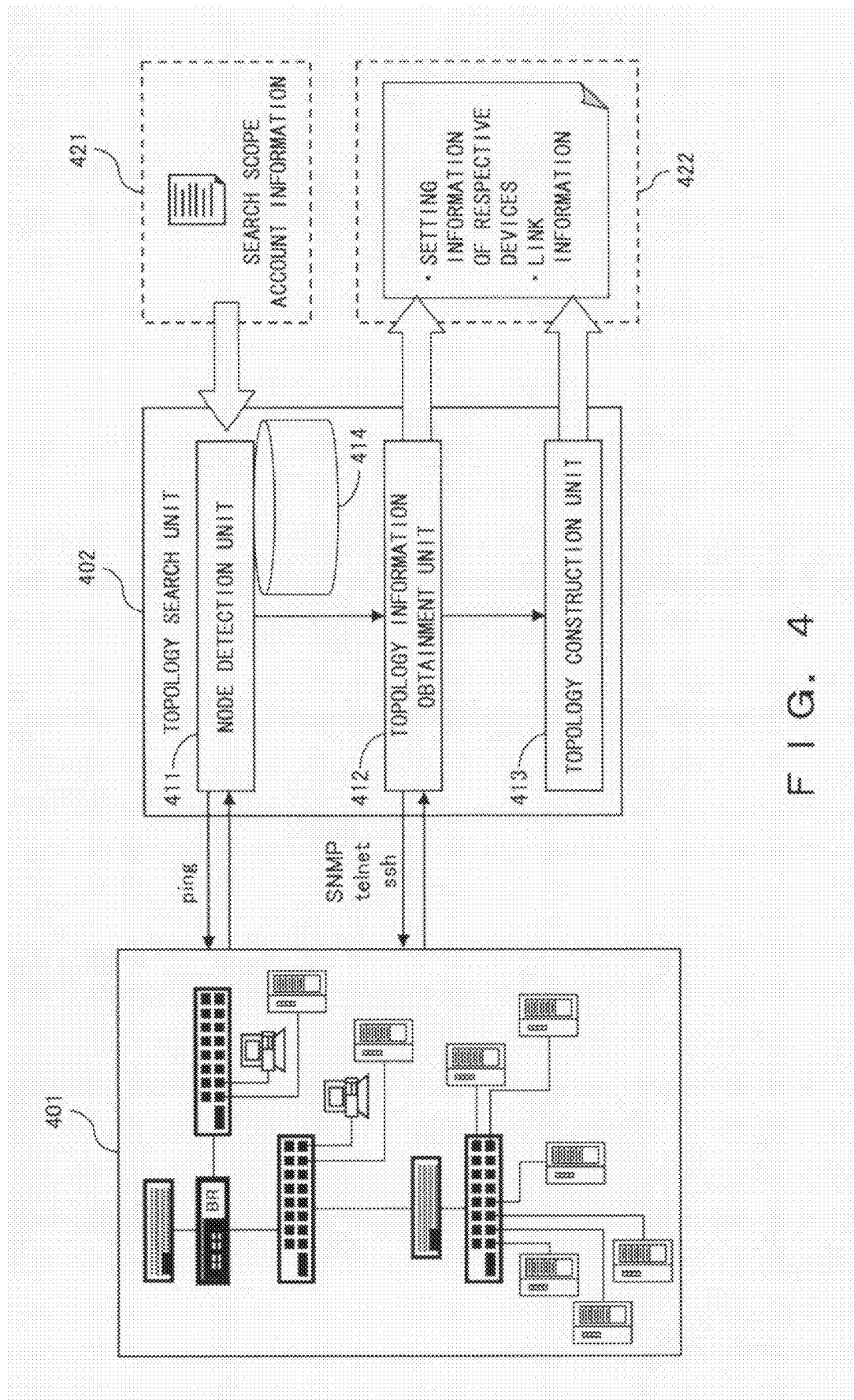
FIG. 4 shows a configuration of a topology search unit.

FIG. 4 shows a topology search unit that is an implementation of the topology search technique. A topology search unit 402 in FIG. 4 comprises a node detection unit 411, a topology information obtainment unit 412, and a topology construction unit 413, and, by following the procedures below, obtains information on the physical and logical connections among the devices constituting the network that is to be monitored.

1. The node detection unit 411 receives input information 421; this input information includes account information of the respective devices and the range of IP addresses (search scope) used in a network 401 to be monitored. Then, a search is made of the search scope by using the ping technique, the devices (nodes) constituting the network 401 are detected, and a list 414 of the detected nodes is created.

2. The topology information obtainment unit 412 obtains information on the setting and services of the detected network devices by using SNMP, telnet, or the ssh (Secure Shell) technique. The account information on the respective devices necessary for obtaining the information is received from the node detection unit 411.

3. The topology construction unit 413 obtains from the obtained information the physical and logical connection relationships among the devices, and stores the relationships as a topology database in a form that allows them to be used for various purposes. Output information 422 that is information output from the topology search unit 402 includes setting information, link information, and the like on the respective devices.

The topology construction unit 413 obtains media access control (MAC) learning tables in the respective devices, refers to the MAC learning tables in the respective devices, and thereby grasps the physical connection relationships among the devices. In each MAC learning table, correspondence relationships between the transmission source ports and transmission destination MAC addresses are recorded.

Figure 5:
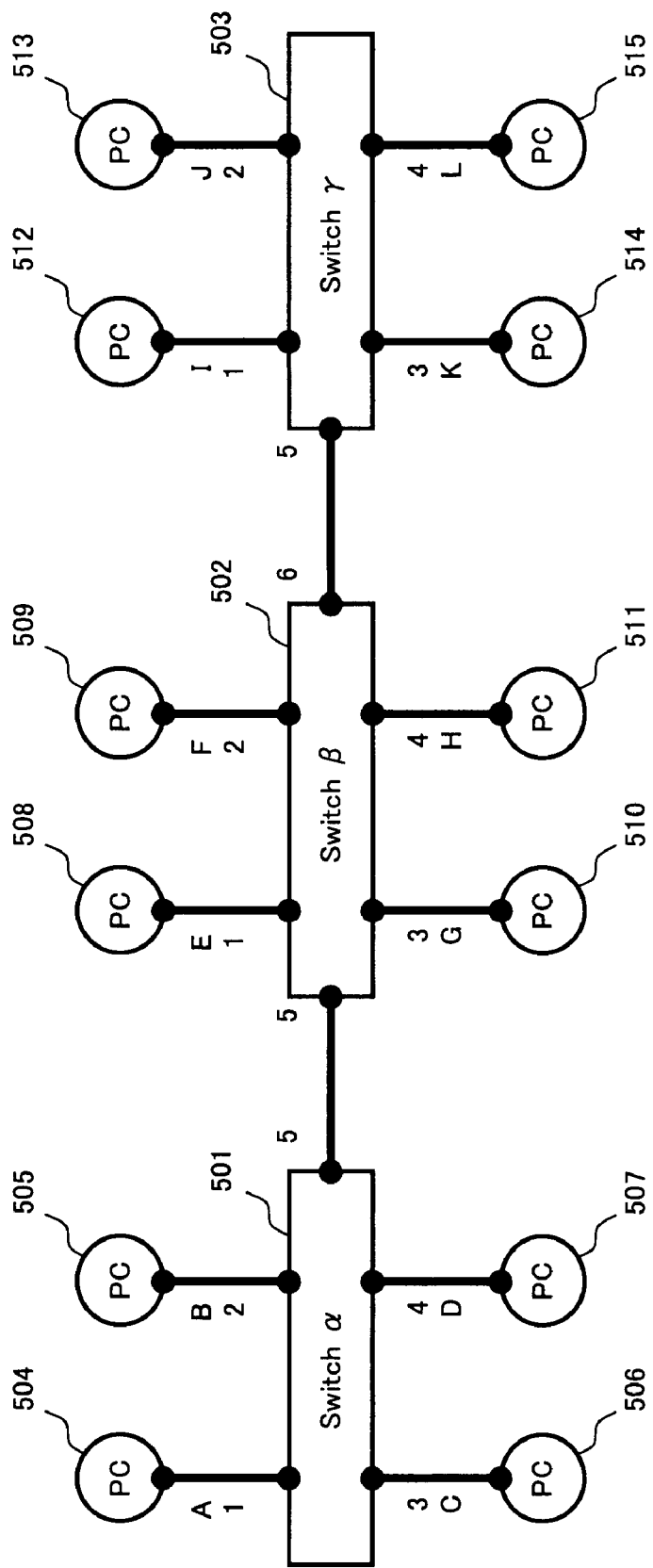
FIG. 5 shows physical connections.

FIG. 5 shows an example of a physical connection in a network that is to be monitored. This network comprises switches 501 through 503, and personal computers (PCs) 504 through 515.

Switch 501 (switch α) includes ports 1 through 5. Personal computers 504 through 507 are respectively connected to ports 1 through 4, and switch 502 is connected to port 5.

Switch 502 (switch β) includes ports 1 through 6. Personal computers 508 through 511 are respectively connected to ports 1 through 4. Switches 501 and 503 are respectively connected to ports 5 and 6.

Switch 503 (switch γ) includes ports 1 through 5. Personal computers 512 through 515 are respectively connected to ports 1 through 4. Switch 502 is connected to port 5.

The MAC addresses of personal computers 504 through 515 are respectively A through L.

In order to perform switching services, switches 501 through 503 respectively include MAC learning tables 601 through 603 that are configured in the manner shown in FIG. 6. In each of these MAC learning tables, the learned MAC addresses of the personal computers 504 through 515 are registered in such a manner that each address corresponds to its port.

For example, the MAC addresses E, F, G, and H of the four personal computers under the control of switch β are learned and registered as the addresses corresponding to port 5 of the switch α, and the MAC addresses of the four personal computers under the control of switch α are learned and registered as the addresses corresponding to port 5 of the switch β. On the basis of these pieces of information, it is possible to estimate that port 5 of the switch α and port 5 of the switch β are connected to each other. As described above, it is possible to grasp the connections between the switches and between the switches and the personal computers on the basis of the MAC learning tables in the switches.

When device setting information on switches 501 through 503 and on personal computers 504 through 515 is input, the topology construction unit 413 obtains the link information by following the procedures described below.

First, the topology construction unit 413 extracts the MAC learning tables 601, 602, and 603 from the device setting information of the switches, and searches for physical connections among the switches by referring to the extracted MAC learning tables.

The MAC addresses that are learned as the addresses of ports that connect each set of two switches that are adjacent to each other are the total of the learned MAC addresses of all the ports other than the ports connecting the sets of two switches.

The topology construction unit 413 examines the MAC address learning tables of all the switches in the network, determines whether or not logical OR comparisons are satisfied on the port-to-port basis between the MAC addresses that have been learned as the addresses of the respective ports of the switches, and obtains the physical connections between the switches.

Next, the topology construction unit 413 searches for the physical connections between the switches and the respective personal computers on the basis of the MAC addresses of the personal computers 504 through 515 and the search result of the physical connections between the switches. In this search of the ports that are not used for the connections between switches, the topology construction unit 413 searches among the MAC learning tables in the respective switches for the ports that have learned the MAC addresses of the devices (personal computers) other than the switches in the network, and obtains the physical connections between the corresponding ports and the personal computers.

When the information on physical connections (link information) is obtained by following the above procedures, the topology construction unit 413 performs topology processes for each layer by using the link information and the setting information of the respective devices, and obtains the topology across a plurality of layers.

In this process, the physical connections or the logical connections included in the topology of the lower layers of a plurality of layers is grouped by using the setting information, an information-reaching scope on higher layers is generated, and the topology of the higher layers is generated on the basis of the generated information-reaching scope. The topology across a plurality of layers is generated by repeating the above processes on the layers in the following order: the physical layer, the MAC layer, the IP layer, the TCP/UDP (Transmission Control Protocol/User Datagram Protocol) layer, and the application layer.

(2) Path Search Technique

This technique relates to a technique of calculating paths connecting a source device (node) and a sink device (node) via adjacent nodes of the path in a network on the basis of the source and sink devices (nodes) of the path that is to be monitored and a topology database that is the output result of the topology search technique.

Thereby, it is possible to grasp the "path information" on communications between two points in networks at the level of network devices that are used not only on the IP layer, but also on the MAC layer (including information on an L2 switch or the like that transmits the data). Specifically, the path search is performed by following the procedures described below.

1. Obtainment of Next Hop on IP Layer

The IP address of the next hop on the IP layer that is to be used for reaching from the source node to the sink node is obtained from routing information of the source node.

2. Obtainment of Next Hop of MAC Layer

The MAC address of the next hop on the MAC layer that is used for reaching the IP address of the next hop is obtained on the basis of the MAC learning table in the source node. By referring to the link information that has been obtained by using the topology search technique, the device that is to serve as the next hop on the MAC layer is determined.

3. The obtainment of the next hop on the MAC layer (as described in procedure (2)) is repeated with respect to the devices that are to serve as the next hops instead of the source nodes, and obtainment of the path information on the MAC layer is repeated. When the device serving as the next hop on the IP layer is reached by repeating the above process, the obtainment of the next hop on the IP layer (as described in procedure (1)) is repeated, and the device that is to serve as the next hop on the IP layer is determined. The above processes are repeated until the IP address of the sink node is reached.

Figure 7:
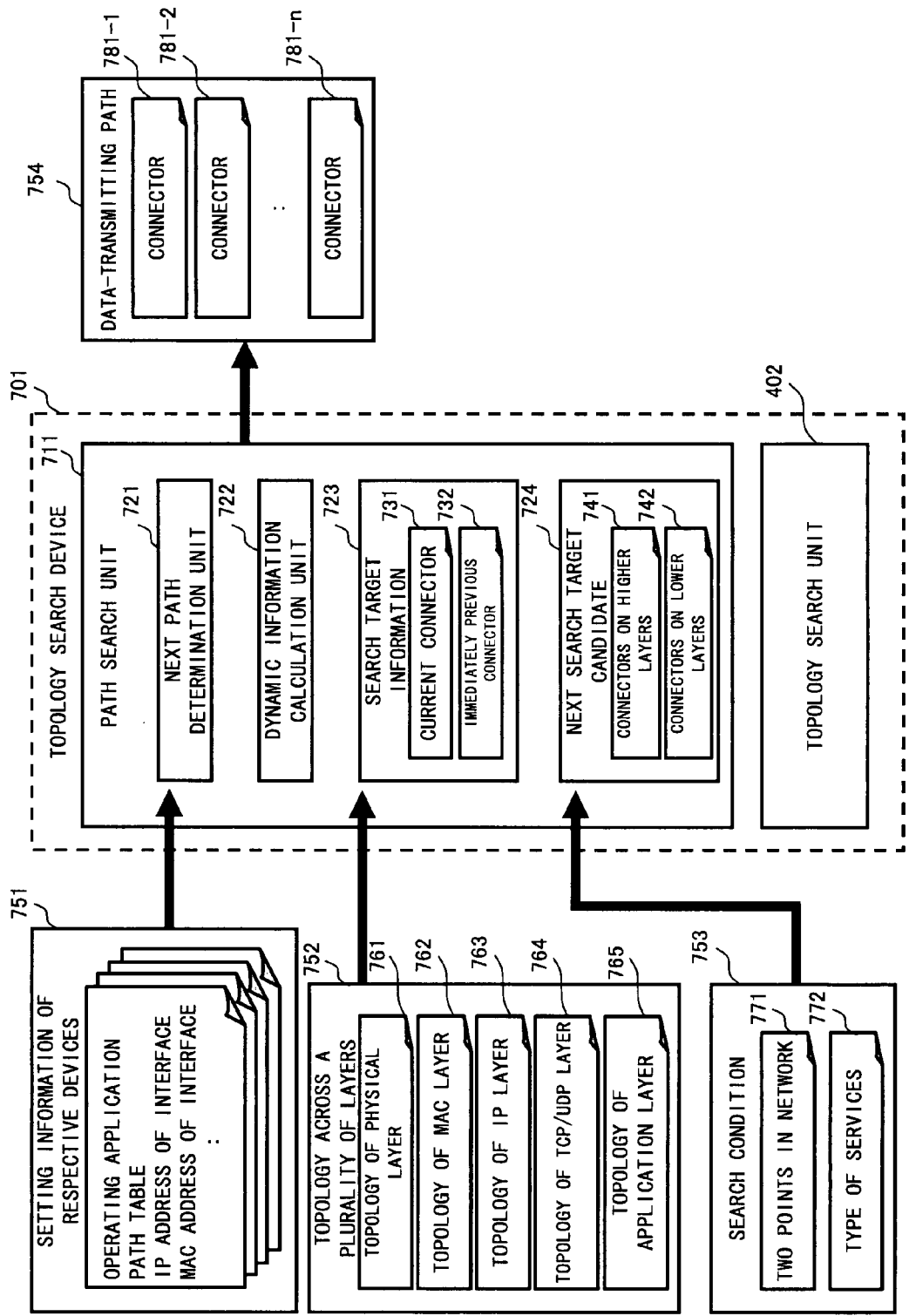
FIG. 7 shows a configuration of a topology search device.

FIG. 7 shows a topology search device in which the path search technique as described above is implemented. A topology search device 701 in FIG. 7 comprises the topology search unit 402 in FIG. 4 and a path search unit 711. The path search unit 711 comprises a next path determination unit 721 and a dynamic information calculation unit 722, and holds search target information 723 and next search target information 724.

The path search unit 711 receives as inputs setting information 751 of respective devices, a topology 752 across a plurality of layers, and a search condition 753; performs a path search process; and outputs a data-transmitting path 754 as path information.

The topology 752 comprises a topology 761 of the physical layer corresponding to link information, a topology 762 of the MAC layer, a topology 763 of the IP layer, a topology 764 of the TCP/UDP layer, and a topology 765 of the application layer. The search condition 753 includes two points 771 that respectively serve as the source and sink points in the network, and services of type 772. The two points 771 in the network are designated on the basis of the node names, the IP addresses or the like.

The search target information 723 includes information of a current connector 731 and information of an immediately previous connector 732. The next search target information 724 includes information of connectors 741 on higher layers and information of connectors 742 on lower layers. The data-transmitting path 754 includes pieces of information of connectors 781-1 through 781-n through which the data has been transmitted.

The physical and logical interfaces used for physical and logical connections between the devices on the respective layers are represented by "connectors". The functions for terminating communications and for transferring data among a plurality of connectors in each device are represented by "services".

Figure 8:
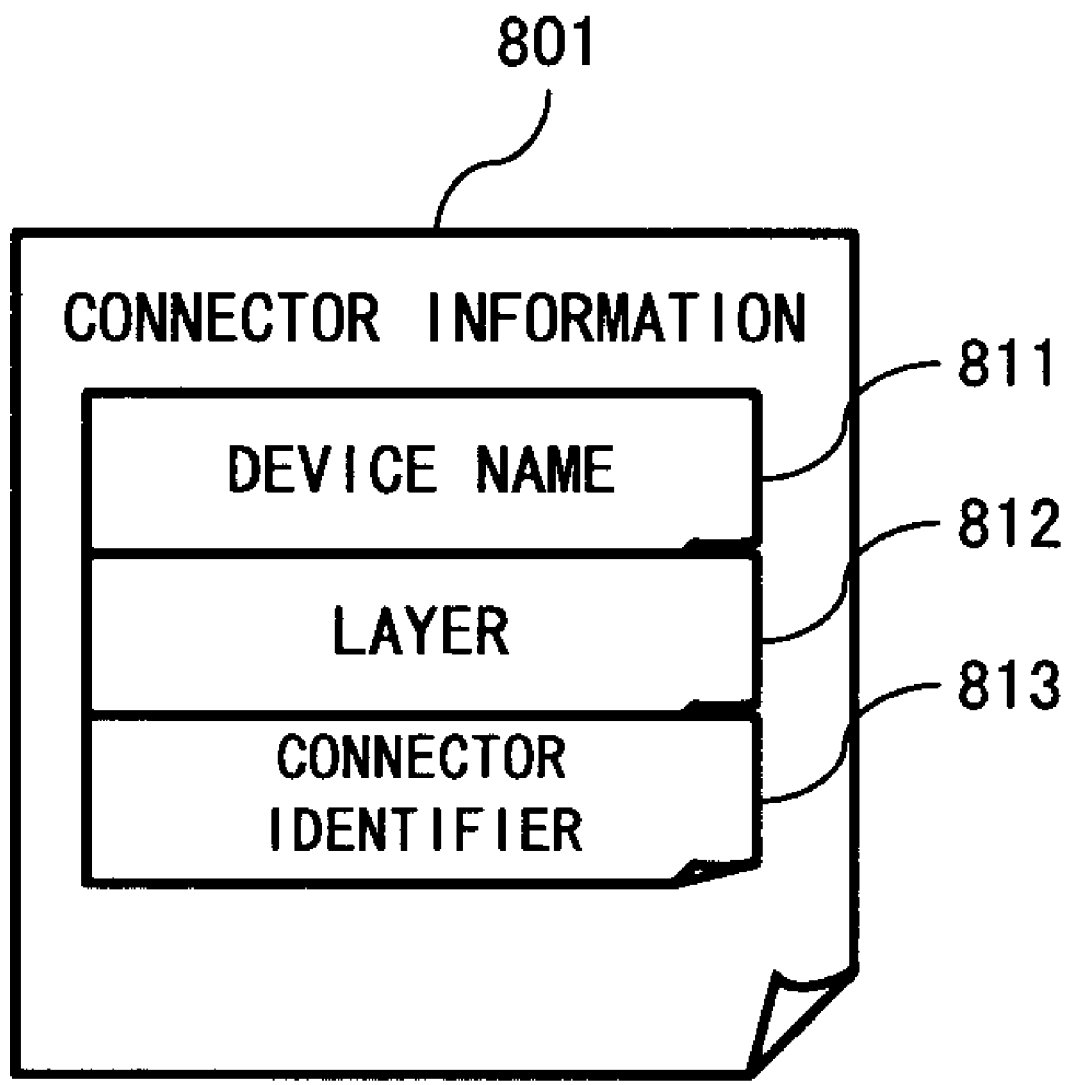
FIG. 8 shows a data configuration of connectors.

FIG. 8 shows a data configuration of the respective pieces of connector information such as that of the current connector 731, the immediately previous connector 732, the connectors 741 on higher layers, the connectors 742 on lower layers, and connectors 781-1 through 781-n. Connector information 801 in FIG. 8 includes a device name 811 that includes the corresponding connector, discrimination information 812 for the layer, and a connector identifier 813 that is used for uniquely discriminating connectors on each one and the same layer.

The next path determination unit 721 repeats obtainment of the next hop by using the setting information 751, the topology 752, and the search condition 753 while holding the information of the current search target in the search target information 723 and holding the information of the next search target in the next search target information 724. Then, the next path determination unit 721 outputs as the data-transmitting path 754 the information on the connectors between the source node and the sink node. When the transmission destination cannot be obtained by the next path determination unit 721 or when the transmission destination has to be obtained by means of, for example, name resolution or the like, the dynamic information calculation unit 722 dynamically obtains the transmission destination.

In the present embodiment, by periodically carrying out the above (1) Topology search and (2) Path search, the link information of the network that is to be monitored and the path information corresponding to a plurality of combinations of the source points and the sink points in the network are obtained beforehand. Also, the operation management server is provided, and monitoring agents are provided in a plurality of nodes in the network to be monitored.

Figure 9:
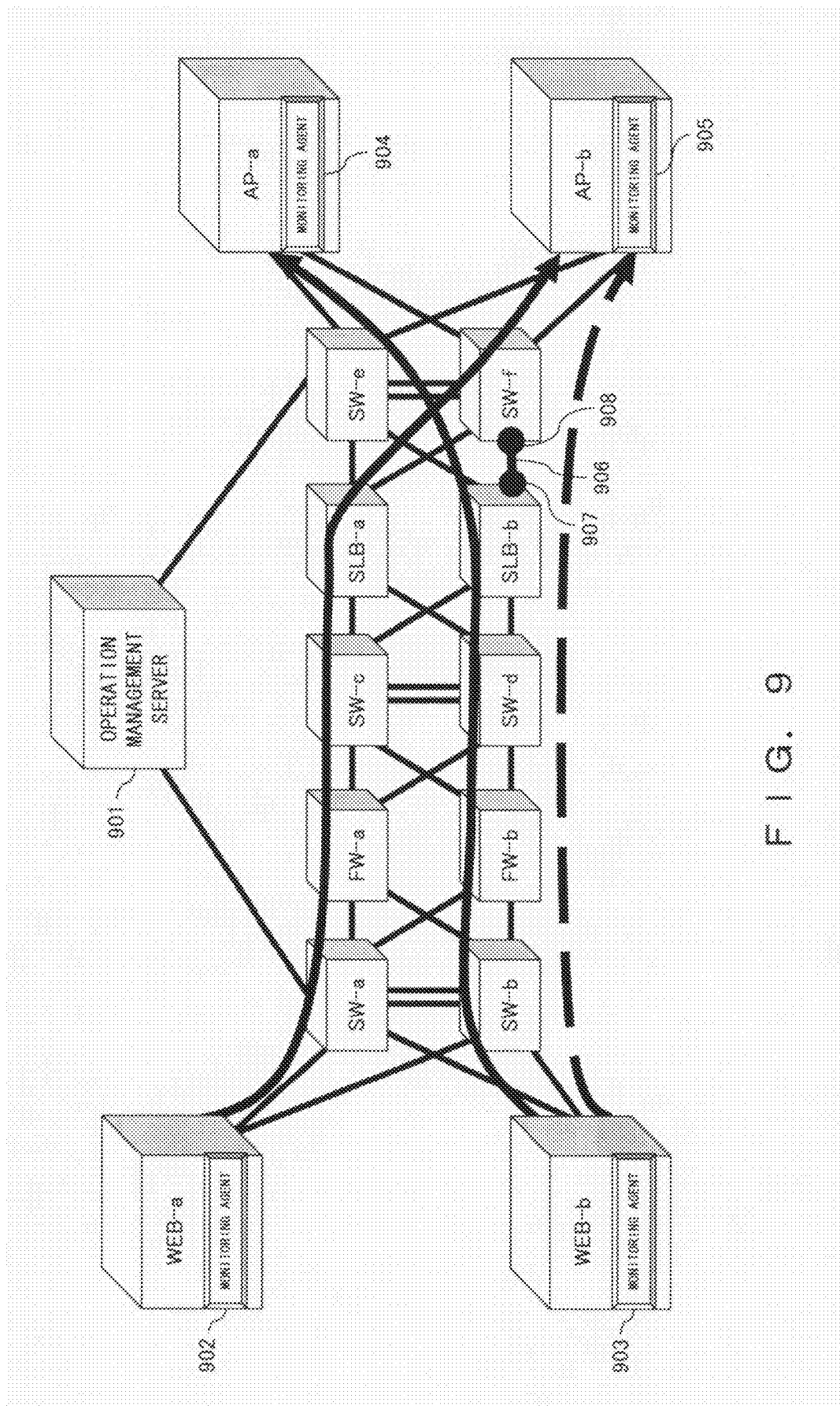
FIG. 9 shows a network system according to the present invention.

FIG. 9 shows an example of a network system according to the present embodiment. The system shown in FIG. 9 comprises the devices listed below.
Switches: SW-a, SW-b, SW-c, SW-d, SW-e, and SW-f
Firewalls: FW-a and FW-b
Server load balancers: SLB-a and SLB-b
Web servers: WEB-a and WEB-b
Application servers: AP-a and AP-b
Operation management server 901

The monitoring agents 902, 903, 904, and 905 are respectively provided in the web servers WEB-a, WEB-b and the application servers AP-a and AP-b.

When a communication abnormality is caused, the operation management server 901 collates the path information of the abnormal communication with path information of other communications with normal communications. Then, the operation management server 901 extracts the links that are included in the path of the abnormal communication and that are not included in the paths of other communications with normal communications, and outputs these links and the ports at both ends of each link as candidates for the position at which the failure has occurred.

In the case when, for example, the communication from the web server WEB-b to the application server AP-a and the communication from the web server WEB-a to the application server AP-b are both normal, and when an abnormality is caused in the communication from the web server WEB-b to the application server AP-b, the following link and ports are obtained as the candidates for the position at which the failure has occurred.
Link 906 between the server load balancer SLB-b and the switch SW-f
Port 907 of the server load balancer SLB-b (for the switch SW-f)
Port 908 of the switch SW-f (for the server load balancer SLB-b)

Figure 10:
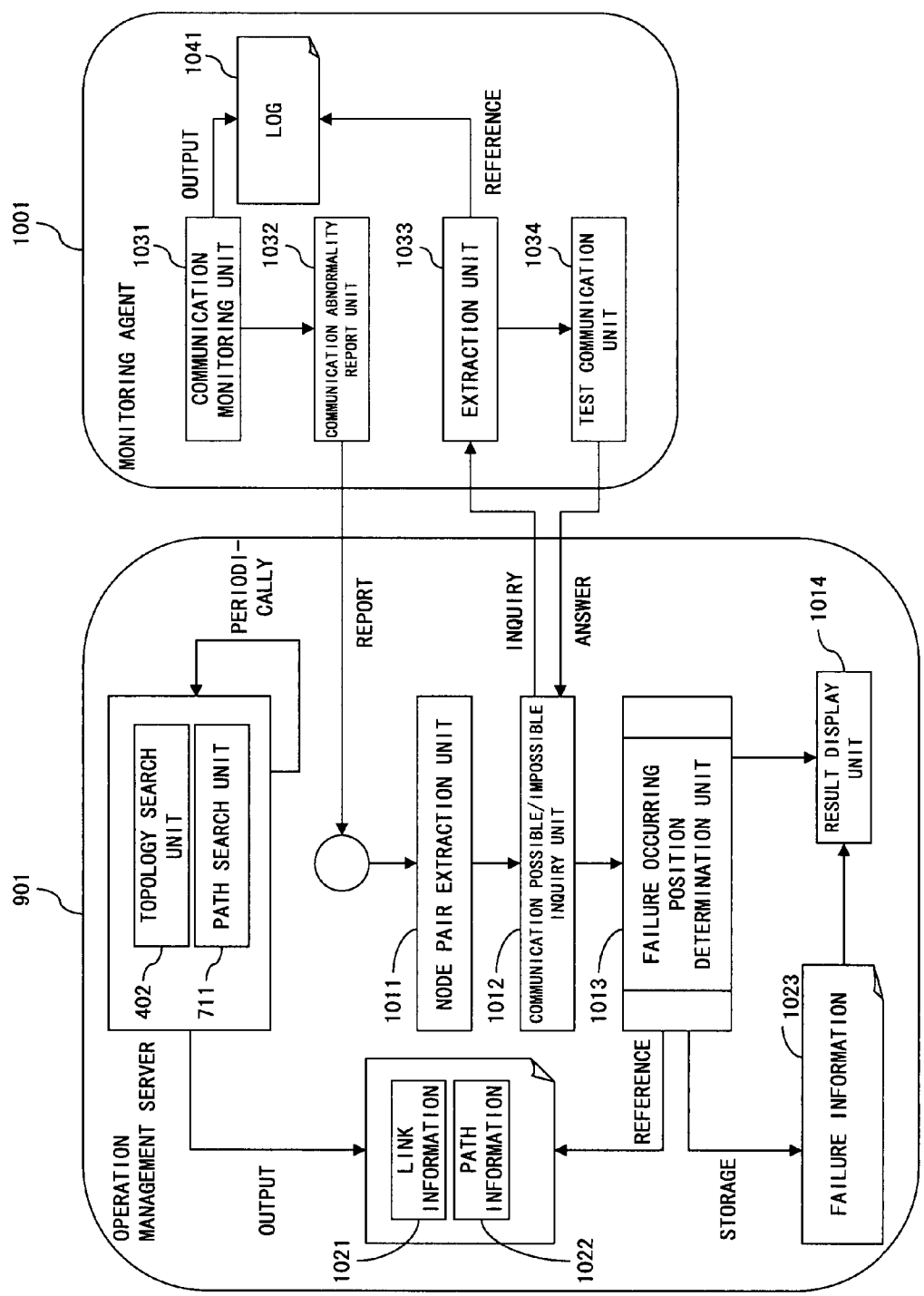
FIG. 10 is a function block diagram showing an operation management server and a monitoring agent.

FIG. 10 is a block diagram showing functions of the operation management server 901 and the monitoring agents 902 through 905 shown in FIG. 9. The operation management server 901 comprises a node pair extraction unit 1011, a communication possible/impossible inquiry unit 1012, a failure-occurring-position determination unit 1013, and a result display unit 1014, in addition to the topology search unit 402 in FIG. 4 and the path search unit 711 in FIG. 7. Monitoring agents 1001 correspond to the monitoring agents 902 through 905, and comprise a communication monitoring unit 1031, a communication abnormality report unit 1032, an extraction unit 1033, and a test communication unit 1034.

The topology search unit 402 and the path search unit 711 in the operation management server 901 obtains the latest link information 1021 (within one day from the update, for example) in the network that is to be monitored and path information 1022 with respect to a plurality of pairs of nodes by periodically performing the topology search and the path search. These pieces of information are stored in the operation management server 901.

The communication monitoring unit 1031 in the monitoring agent 1001 continuously monitors communications with other nodes (the nodes for which the path information that goes to them is grasped beforehand), and creates a log 1041. In the log 1041, the IP addresses of the communication destinations and information on whether or not communication is possible are accumulated for a prescribed period. When the communication monitoring unit 1031 detects an abnormality in communication with another node, the communication abnormality report unit 1032 reports this fact to the operation management server 901.

The node pair extraction unit 1011 in the operation management server 901 extracts the node pair that is the target of a communication possible/impossible inquiry. As the communication possible/impossible inquiry target, all the node pairs on which the path information is grasped are extracted, for example. The communication possible/impossible inquiry unit 1012 inquires, of the respective monitoring agents 1001 provided in the network that is to be monitored, whether or not the communication between each of the extracted node pairs is possible.

In response to this inquiry, the monitoring agent 1001 obtains the information representing whether or not the communication between each of the specified node pairs is possible by using one of the two methods below. Then, the monitoring agent 1001 sends the answer to the operation management server 901.

(a) The test communication unit 1034 performs test communication to the destination nodes included in the node pair when the inquiry is made by the operation management server 901.

(b) The extraction unit 1033 obtains the information on whether or not the communication with the destination nodes is included in the node pair by referring to the log 1041. In this case, the communication possible/impossible inquiry unit 1012 instructs the monitoring agent 1001 of the time period during which the inquiry is to be made. The extraction unit 1033 checks whether nor the communication with the destination nodes during this time period has been successfully completed. A prescribed period of time that is before and after the time at which the communication abnormality occurred or the like is specified as the time period about which the inquiry is to be made.

If, for example, an abnormality occurs at 10:35:20 on the communication from the web server WEB-b to the application server AP-b, the monitoring agent 902 in the web server WEB-a refers to the log 1041 and checks whether or not there is a record of successes/failures of communication from the web server WEB-a to the application server AP-a or from the web server WEB-a to the application server AP-b during the time period between 10:34:50 and 10:35:50. When there is a record, the record is reported to the operation management server 901 as the answer.

Next, if there is a failure that blocks communication in any one of the links that constitutes the communication path, the failure-occurring-position determination unit 1013 in the operation management server 901 acquires a recognition that the communication is not being performed normally on the basis of the link information 1021, the path information 1022, and the information on whether or not communication is currently possible. Then, on the basis of the above recognition, the failure-occurring-position determination unit 1013 squeezes positions that are plausible candidates for having been involved in a failure that caused the abnormality.

The failure-occurring-position determination unit 1013 extracts, one by one, the links included in the path for the node pair about which the communication abnormality is recognized, and checks whether or not such links are included in paths for other node pairs between which normal communication is possible. Then, a set of the links that are not included in the paths that allow normal communication and a set of the ports at both ends of the links are determined to be the candidates for the position at which the failure has occurred.

The result display unit 1014 displays, on its screen, information about the candidates for the position at which the failure has occurred, and thereby reports the process result to the manager. By, for example, displaying in different colors on a screen showing the network that is being monitored the devices and links that are the candidates for the position at which the failure has occurred, the candidates for the position at which the failure has occurred can be easily found.

Also, in order that the process result can be reused, information on the time at which the abnormality occurred, the path on which the abnormality occurred, the candidates for the position at which the failure occurred, and the position at which the failure occurred are stored, as failure information 1023, in the operation management server 901. The result display unit 1014 can again display the state of the network at a particular past moment by referring to the stored failure information 1023.

According to the system described above, when a communication abnormality has occurred between nodes, it is possible to squeeze positions that are plausible candidates for having been involved in a failure that caused the abnormal communication from the range including all the conceivable communication paths into the range including the paths that have actually been used for the communication and that are not used for other normal communications.

The accuracy of squeezing depends upon the number (density) of monitoring agents provided in the network. The larger the number of monitoring agents that are provided for obtaining information on the possibility/impossibility of communication corresponding to a large number of node pairs, the smaller number of positions that are plausible candidates for having been involved in a failure that caused an abnormal communication can be squeezed. This method of squeezing can be applied to the case in which there are one or more positions at which failures simultaneously occur in the network that is monitored.

When a communication abnormality occurs and all the node pairs other than the node pair between which the abnormality is recognized are examined, it is probable that process efficiency decreases because there are too many node pairs that have to be examined. Accordingly, it is preferable to narrow the scope of the targets for which an examination is made of whether or not communication is possible by following the procedures below.

1. The administrator performs grouping on the servers into groups, each group including the servers that have similarities to one another in aspects of topologies or functions, and registers the groups in the operation management server 901 prior to occurrences of abnormalities.

2. The node pair extraction unit 1011 examines the server groups that include the nodes in the node pair between which a communication abnormality has occurred, and extracts, as the target of a communication possible/impossible inquiry, two nodes that can constitute a pair between these server groups.

Figure 11:
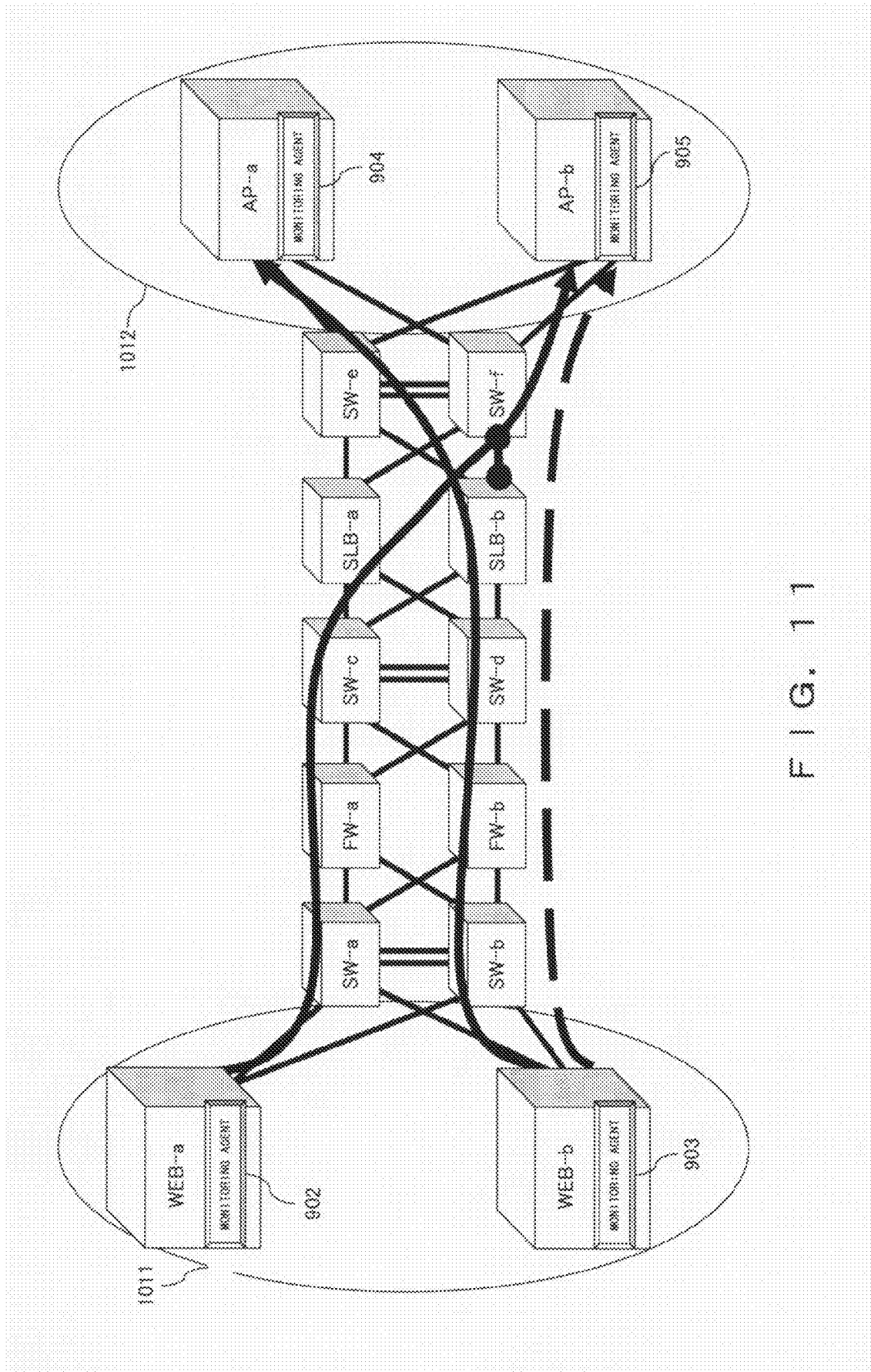
FIG. 11 shows grouping performed by a server.

For example, the web servers WEB-a and WEB-b are registered as the servers included in the web server group 1101, and the application servers AP-a and AP-b are registered as the servers included in the AP server group 1102, as shown in FIG. 11 as they would appear prior to an occurrence of an abnormality. When an abnormality has occurred in communication from the web server WEB-b to the application server AP-b, the pairs described below are extracted such that the nodes in the web server group 1101 and the nodes in the AP server group 1102 are in the following pairs:

web server WEB-a and application server AP-a web server WEB-a and application server AP-b web server WEB-b and application server AP-a Then, it is inquired whether or not communication is possible from the web server WEB-a to the application server AP-a, from the web server WEB-a to the application server AP-b, and from the web server WEB-b to the application server AP-a. The node pair of the web server WEB-b and the application server AP-b is the node pair between which the communication abnormality has occurred, thus this pair is not handled as the target of the communication possible/impossible inquiry.

Next, the processes of squeezing positions that are plausible candidates for having been involved in a failure in the network system shown in FIG. 9 are explained in more detail by referring to FIGS. 12 through 17.

Figure 12:
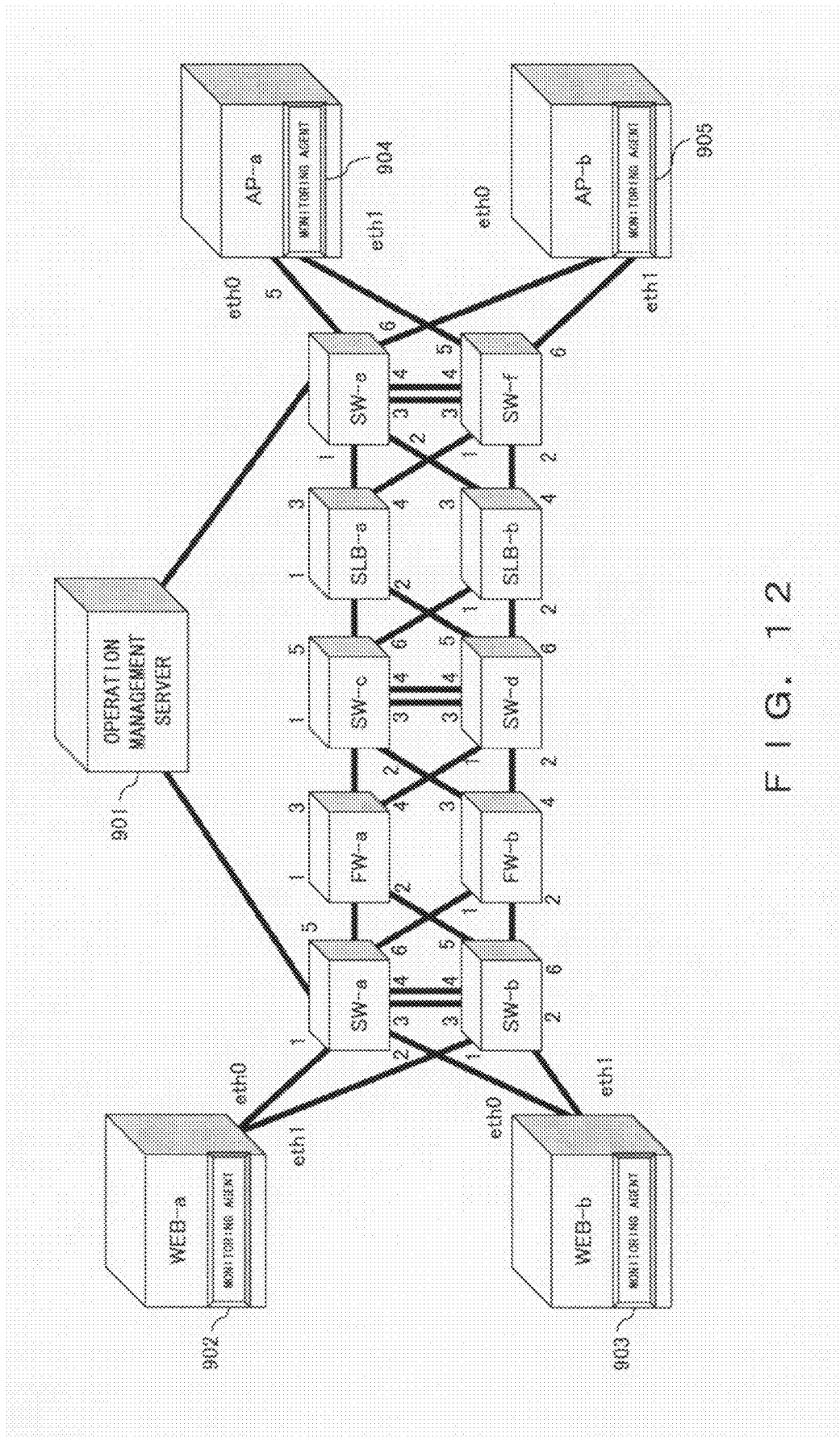
FIG. 12 shows interface identifiers of respective devices.

FIG. 12 shows the identifiers of the interfaces (connectors) in the respective devices in the network in FIG. 9 that is to be monitored. The interface identifiers of these devices are as listed below.

SW-a, SW-b, SW-c, SW-d, SW-e, and SW-f: ports 1 through 6

FW-a, FW-b, SLB-a, and SLB-b: ports 1 through 4

WEB-a, WEB-b, AP-a, and AP-b: eth0 and eth1

Figure 14:
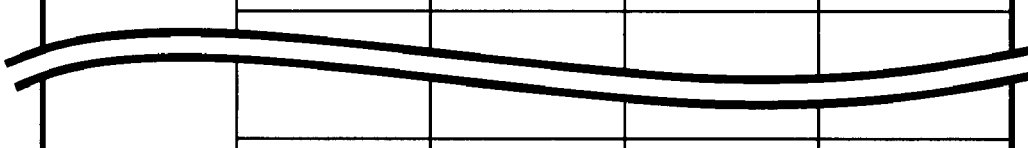
FIG. 14 shows path information.

FIGS. 13 and 14 show examples of the link information and the path information used for the network shown in FIG. 12. The link information shown in FIG. 13 includes, as the topology of the physical layer, identifiers (connection IDs) of the respective links, the identifiers of the nodes at both ends of the links, and the identifiers of the connectors in the nodes. For example, it is possible to understand that the link having the connection ID "1" is the link that connects the connector "eth0" of the node "WEB-a" and the connector "port1" of the node "SW-a".

The path information shown in FIG. 14 corresponds to the information on the path whose source point is the web server WEB-b and whose sink point is the application server AP-b, and in this path information the connection IDs of the links, the identifiers of the nodes at both ends of the links, and the identifiers of the connectors in the nodes are recorded in the order starting from the one closest to the source point.

Figure 15:
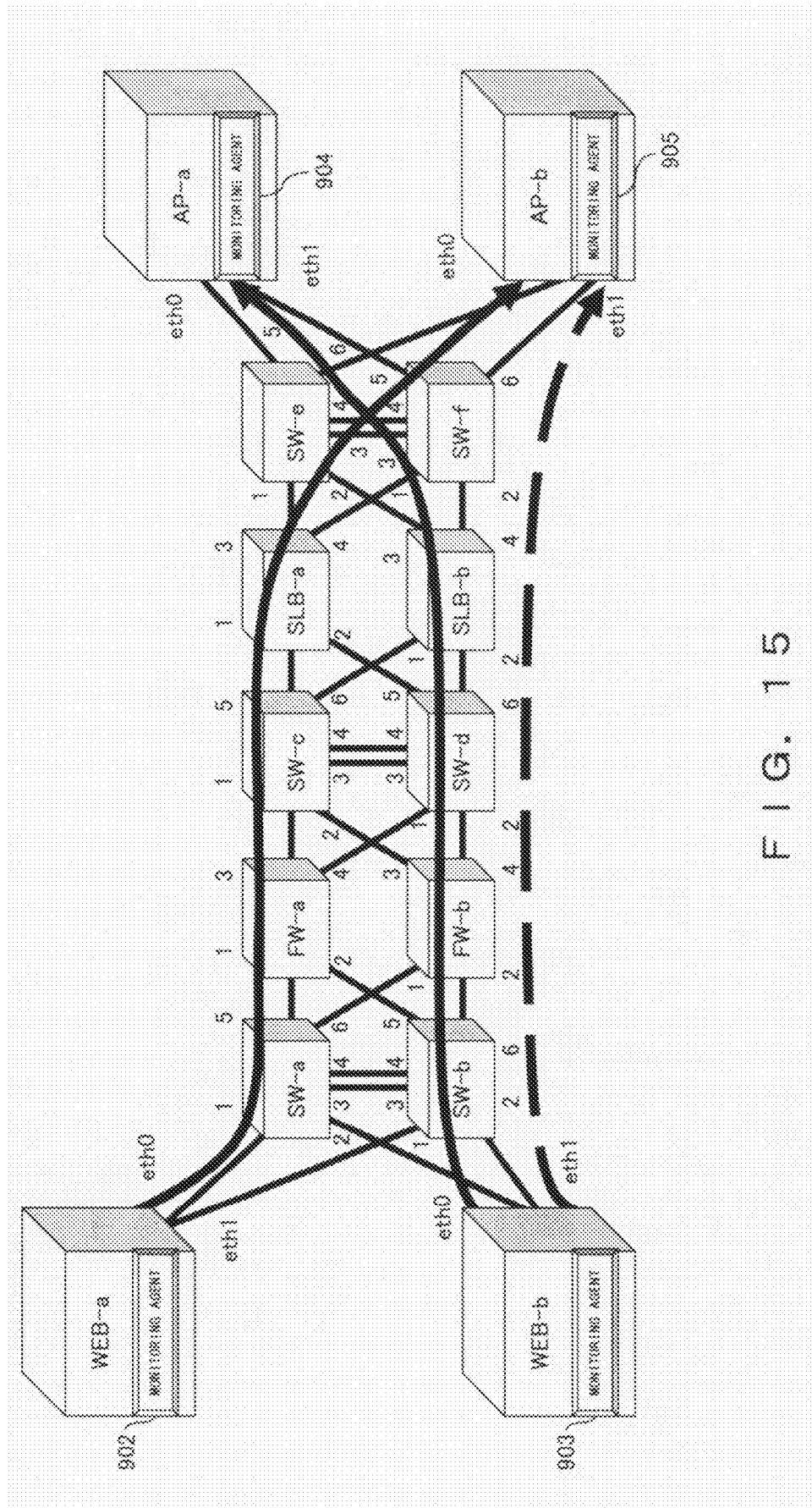
FIG. 15 shows a state of a network when a communication abnormality has occurred.
Figure 17:
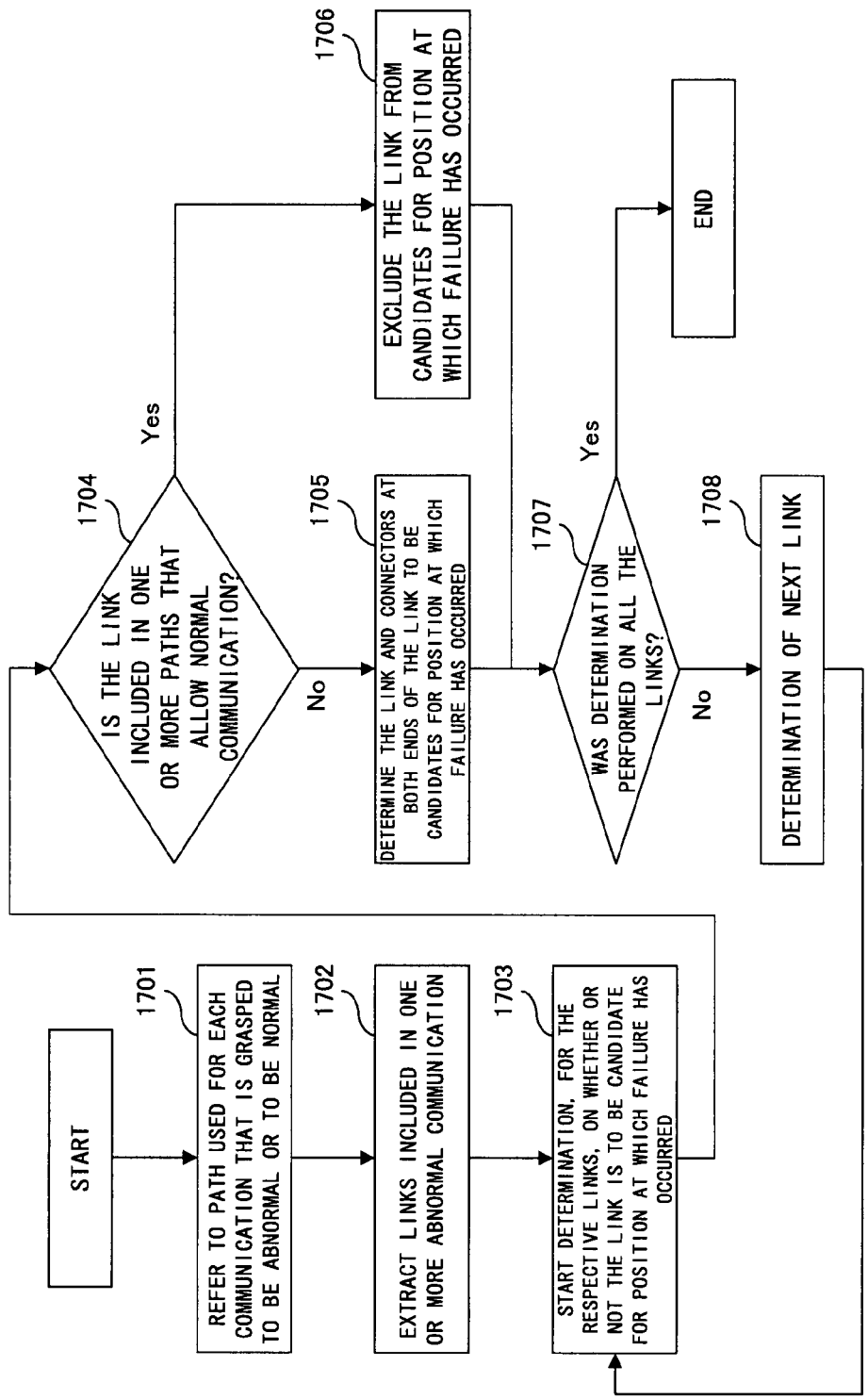
FIG. 17 shows a flowchart of a failure-occurring-positions scope-narrowing process.

FIG. 15 shows the state of the network when a communication abnormality has occurred. As a result of, for example, detection of an abnormality in the communication whose source point is the web server WEB-b and whose sink point is the application server AP-b and also test communication performed on the other paths, it is grasped that the communication from the web server WEB-a to the application server AP-b and the communication from the web server WEB-b to the application server AP-a are normal. In this case, the failure-occurring-position determination unit 1013 creates determination process data as shown in FIG. 16, and performs the failure-occurring-positions scope-narrowing process in accordance with the flowchart shown in FIG. 17.

As the determination process data shown in FIG. 16, the information below is registered on the respective links constituting the path on which the communication abnormality has occurred.

Connection IDs

Source point of link: the identifiers of the nodes and connectors in the source point of the link Sink point of link: the identifiers of the node and connectors in the sink point of the link Whether or not the link is included in the path from the web server WEB-b to the application server AP-b Whether or not the link is included in the path from the web server WEB-b to the application server AP-a Whether or not the link is included in the path from the web server WEB-a to the application server AP-b Whether or not the link is included in the pool of candidates for the position at which the failure has occurred Filled circles indicate that the link is included in the corresponding path, and black star symbols indicate that the link and the connectors are the candidates for the position at which the failure has occurred. The connection ID information, the source point of the link, and the sink point of the link is obtained from the link information shown in FIG. 13, and the information on whether or not the link is included in the path is obtained from the path information shown in FIG. 14. As the determination process data shown in FIG. 16, information on whether communication on the respective paths is possible or impossible is further registered.

The failure-occurring-position determination unit 1013 first refers to the path used for each communication that is included in the path information and that is grasped to be abnormal or to be normal (step 1701), and extracts links included in one or more abnormal communication (step 1702). Then, the failure-occurring-position determination unit 1013 creates the determination process data on the extracted links, and starts determination, for the respective links, on whether or not the link is to be one of the candidates for a position at which a failure has occurred (step 1703).

First, it is checked whether or not the first link is included in one or more paths that allow normal communication by referring to the determination process data (step 1704). Then, if the link is not included in any of the paths allowing normal communication, the link itself and the connectors at both ends of the link are determined to be candidates for the position at which the failure has occurred, and a black star symbol is recorded in the corresponding row in the determination process data (step 1705). When the link is included in one of the paths allowing normal communication, the link itself and the connectors at both ends of the link are excluded from the candidates for the position at which the failure has occurred (step 1706).

Next, it is checked whether or not determination was performed on all the links (step 1707), and if there is a link on which the determination was not performed, the process of step 1703 and the subsequent steps are repeated after selecting the next link (step 1708). When there is no link on which the determination has not been performed, the process is terminated.

In the example shown in FIG. 15, the links included in the path "web server WEB-b to application server AP-b" on which the communication abnormality has occurred are extracted, and the determination process data shown in FIG. 16 is created. Then, the links included in the paths "web server WEB-b to application server AP-a" and "web server WEB-a to application server AP-b" that are not the path on which the abnormality has occurred and that are normal are excluded from the pool of candidates for the position at which the failure has occurred. Then, the link whose connection ID is "24" and port 4 and port 2 of the server load balancer SLB-b that are equivalent to the connectors at both ends of the link are determined to be candidates for the position at which the failure causing the communication abnormality has occurred.

The five layers including the physical layer, MAC layer, IP layer, TCP/UDP layer, and application layer are assumed as the layer configuration of the communication functions in the above embodiments. However, the present invention can be applied not only to this layer configuration but also to other layer configurations.

Figure 18:
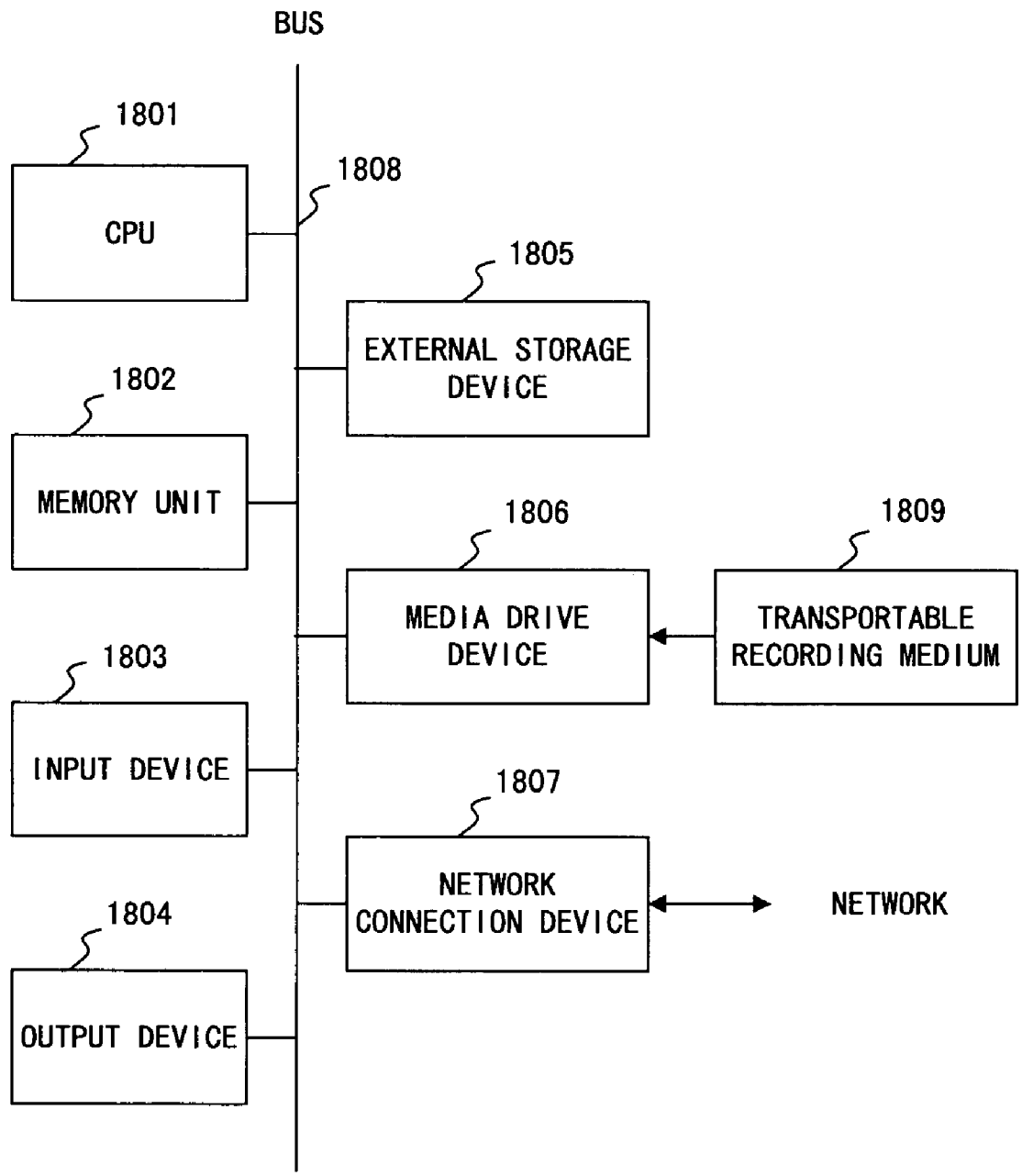
FIG. 18 shows a configuration of information processing equipment.

The topology search device 701 shown in FIG. 7 and the operation management server 901, the web servers 902 and 903, and the application servers 904 and 905 are respectively configured by using, for example, the information processing equipment (computers) shown in FIG. 18. The information processing equipment shown in FIG. 18 comprises a CPU 1801, a memory unit 1802, an input device 1803, an output device 1804, an external storage device 1805, a media drive device 1806, and a network connection device 1807, all of which are connected to one another via a bus 1808.

Examples of the memory unit 1802 include ROM (Read Only Memory), RAM (Random Access Memory) and the like, and it stores programs and data used for processing. The CPU 1801 performs required processes by executing the programs by using the memory unit 1802.

The topology search unit 402, the path search unit 711, the node pair extraction unit 1011, the communication possible/impossible inquiry unit 1012, the failure-occurring-position determination unit 1013, the result display unit 1014 and the monitoring agent 1001 shown in FIG. 10 correspond to the program stored in the memory unit 1802. The link information 1021, the path information 1022, the failure information 1023, the log 1041 shown in FIG. 10 and the determination process data shown in FIG. 16 correspond to the data stored in the memory unit 1802.

The input device 1803 is used for processes such as, for example, inputting instructions and information given by operators. Examples of the output device 1804 include a display device, a printer, a speaker system and the like, and the output device 1804 is used for processes such as, for example, displaying inquiries made by the operators, process results, and the like.

Examples of the external storage device 1805 include a magnetic disk device, an optical disk device, a magneto-optical disk device, a tape device, and the like. The information processing equipment stores a program and data in this external storage device 1805, and loads them onto the memory unit 1802 in order to use them on an as-needed basis. The external storage device 1805 is used also as a database in which the link information 1021, the path information 1022, the failure information 1023, and the log 1041 are stored.

The media drive device 1806 drives a transportable recording medium 1809, and accesses the record in the transportable recording medium 1809. Examples of the transportable recording medium 1809 include any type of computer readable recording media such as a memory card, a flexible disk, an optical disk, a magneto-optical disk and the like. The operators store program and data in this transportable recording medium 1809, and cause them to be loaded onto the memory unit 1802 in order to be able to use them on an as-needed basis.

The network connection device 1807 is connected to communication networks, and converts data for communications. The information processing equipment receives program and data from external devices via the network connection device 1807, and loads them onto the memory unit 1802 in order to use them on an as-needed basis.

Figure 19:
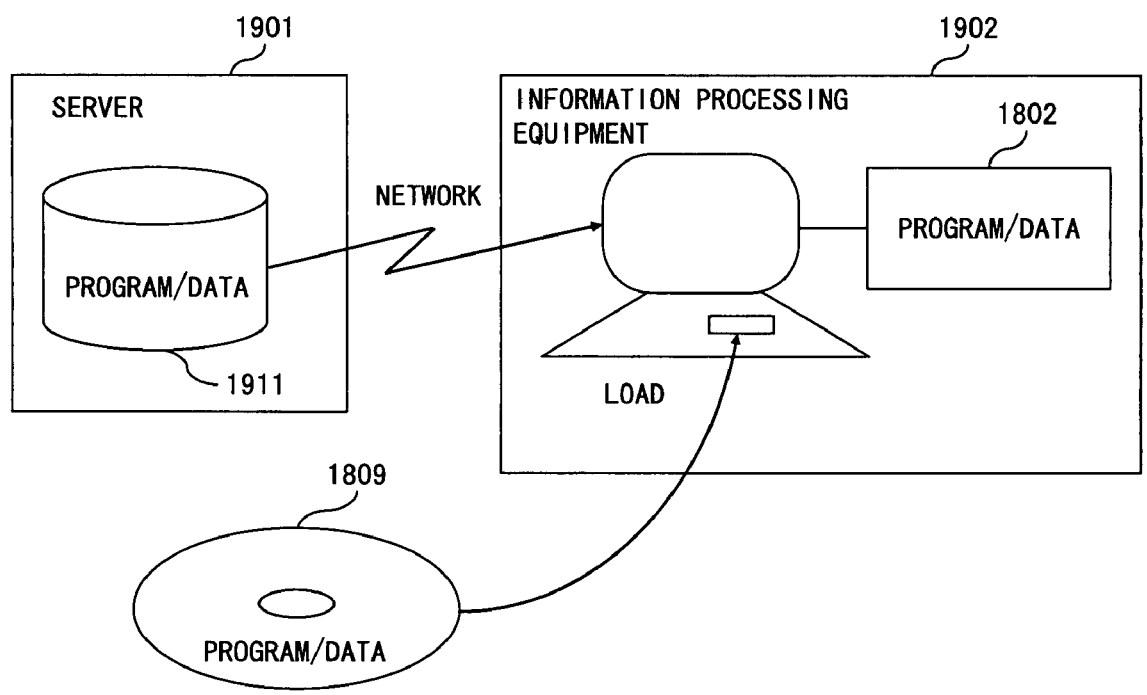
FIG. 19 shows ways of providing programs and data.

FIG. 19 shows a method of providing the program and data to the information processing equipment shown in FIG. 18. The program and data stored in the transportable recording medium 1809 and a database 1911 stored in a server 1901 are loaded onto the memory unit 1802 in information processing equipment 1902. The server 1901 creates carrier signals for carrying the program and data, and transmits the program and data to the information processing equipment 1902 via an arbitrary transmission medium in the network. The CPU 1801 executes the program in order to perform required processes by using the data.

According to the present invention, the effects listed below are achieved in recovery from states in which a failure has occurred in network operation management.

(1) By squeezing positions that are plausible candidates for having been involved in a failure having caused an abnormal communication, it is possible to find the cause and perform recovery operations in a short time.

As described above, in the conventional techniques, when an abnormality has occurred in communication between two points in a network, the positions that are plausible candidates for having been involved in the failure that caused the abnormality includes all the devices and links on the communication paths that can be used for the communication between the two points.

By contrast, according to the present invention, it is possible to squeeze positions that are plausible candidates for having been involved in the failure from the group including all the devices and links on the communication paths between the two points between which the actual communication was performed into a group that only includes the devices and links through which data transmitted by communication that has been confirmed to be normal is not transmitted. Accordingly, it is possible to reduce the number of devices or the like that are to be examined for finding the cause, and to thus shorten the time needed for recovery.

(2) When the communication abnormality has occurred, the probability increases that the incidence of the problem and its urgency in view of services can be grasped.

When the positions that are plausible candidates for having been involved in the failure is squeezed to only include the positions that are in a network with a low importance, as determined by squeezing based on (1), it is possible to determine that the incidence is such that the abnormality does not have an influence on services. As a result of this, it is possible to avoid unnecessarily high labor costs for the above described failure if it is not urgent.

What is claimed is:

1. A computer-readable storage medium in which a program causing a computer to execute a process is recorded, the process comprising:

referring to link information, stored in a storing unit, specifying physical links connecting nodes in a communication network having a plurality of nodes, and referring to path information, stored in the storing unit, specifying at least one link included in communication paths from a source node to a sink node in the communication network when a communication abnormality has occurred in the communication network having a plurality of nodes;

inquiring of nodes in the communication network whether communication is possible or impossible between nodes whose path communication information is grasped, and determining a communication path between the nodes between which communication is possible on the basis of information, being received as an answer, on whether or not communication is possible; and excluding links that are included in a communication path on which the communication abnormality has occurred and that are included in the determined communication path between the nodes, wherein remaining links or nodes at both ends of the remaining links are candidates for a position at which a failure has occurred.

2. The storage medium according to claim 1, the process further comprising:

obtaining from the communication network setting information including information on media access control addresses of interfaces of devices corresponding to respective nodes, creating from the setting information the link information and the path information on a plurality of pairs of a source node and a sink node, and storing in the storing unit the link information and the path information.

3. The storage medium according to claim 2, wherein said creating from the setting information the link information and the path information creates the link information by using the information on the media access control addresses of the interfaces of the devices included in the setting information.

4. The storage medium according to claim 2, wherein said creating from the setting information the link information and the path information groups connections included in topologies of lower layers among a plurality of layers expressing a layer configuration of communication functions of the communication network by using the setting information, creates an information-reaching scope on higher layers, repeats a process of creating topologies of high layers from the information-reaching scope, creates topologies of respective layers, and creates the path information by using the setting information and information of topologies of respective layers.

5. The storage medium according to claim 1, the process further comprising:

grouping a plurality of nodes in the communication network, registering the groups in the storing unit, extracting as communication possible/impossible inquiry targets two nodes that constitute a pair between groups respectively including a source node and a sink node of the communication path on which the communication abnormality has occurred.

6. The storage medium according to claim 1, the process further comprising:

displaying, on a screen showing the communication network, information of the links or nodes that the candidates for a position at which a failure has occurred.

7. The storage medium according to claim 6, the process further comprising:

storing in the storing unit information of the candidates for a position at which a failure has occurred, and again displaying a state of the communication network at a particular past time.

8. An apparatus for locating a position at which a failure has occurred, comprising:

a storing unit configured to store link information specifying physical links connecting nodes in a communication network having a plurality of nodes, and path information specifying at least one link that is included in communication paths from a source node to a sink node in the communication network; and a determination unit configured to inquire of nodes in the communication network whether communication is possible or impossible between nodes whose path communication information is grasped, determine a communication path between the nodes between which communication is possible on the basis of information, being received as an answer, on whether or not communication is possible, and exclude links that are included in a communication path on which the communication abnormality has occurred and that are included in the determined communication path between nodes, remaining links or nodes at both ends of the remaining links being candidates for a position at which the failure has occurred, while referring to the link information and the path information when a communication abnormality has occurred in the communication network.

9. A method of locating a position at which a failure has occurred, comprising:

referring to link information, stored in a storing unit, specifying physical links connecting nodes in a communication network, and referring to path information, stored in the storing unit, specifying at least one link included in communication paths from a source node to a sink node in the communication network, when a communication abnormality has occurred in the communication network having a plurality of nodes;

inquiring of nodes in the communication network whether communication is possible or impossible between nodes whose path communication information is grasped, and determining a communication path between the nodes between which communication is possible on the basis of information, being received as an answer, on whether or not communication is possible; and excluding links that are included in a communication path on which the communication abnormality has occurred and that are included in the determined communication path between the nodes, wherein remaining links or nodes at both ends of the remaining links are candidates for a position at which the failure has occurred.

* * * * *